United States Patent [19]
Chang

[11] Patent Number: 5,285,997
[45] Date of Patent: Feb. 15, 1994

[54] DEVICE FOR LOCKING A LEVER FOR PIVOTING A VALVE

[76] Inventor: King Chang, No. 20, Hsi Wei St.,, San Chung City, Taipei Hsien, Taiwan

[21] Appl. No.: 35,680

[22] Filed: Mar. 23, 1993

[51] Int. Cl.⁵ .............................................. F16K 35/02
[52] U.S. Cl. ..................................... 251/95; 251/102; 251/110
[58] Field of Search ............... 251/95, 102, 104, 110; 70/175, 177, 202, 211

[56] References Cited

U.S. PATENT DOCUMENTS

| | | | |
|---|---|---|---|
| 506,087 | 10/1893 | Adkins | 251/110 |
| 557,943 | 4/1896 | Bayley | 251/110 |
| 1,928,186 | 9/1933 | Prisk | 251/102 |
| 1,940,797 | 12/1933 | Halvorsen | 251/102 |
| 2,081,464 | 5/1937 | Stewart | 251/110 |
| 2,158,574 | 5/1939 | Feiks | 251/104 |
| 2,853,100 | 9/1958 | Donnelly | 251/102 |
| 2,872,216 | 2/1959 | Kaiser | 251/102 |
| 3,319,671 | 5/1967 | Wiseman | 251/110 |
| 3,648,970 | 3/1972 | Hartmann et al. | 251/110 |

FOREIGN PATENT DOCUMENTS

| | | | |
|---|---|---|---|
| 2326139 | 12/1974 | Fed. Rep. of Germany | 251/110 |
| 840554 | 4/1939 | France | 251/102 |

*Primary Examiner*—George L. Walton
*Attorney, Agent, or Firm*—Kolisch Hartwell Dickinson McCormick & Heuser

[57] ABSTRACT

A device for locking a lever for pivoting a valve contained in a valve housing. A recess is formed in the valve housing. An annular groove is formed in the recess. A spring is sited in the recess. A latch has a relatively large middle section connecting an upper section with a lower section. The latch is sited in the recess so that the lower section thereof is inserted in the spring and that the middle portion thereof is sited on the spring. A C-ring engages in the groove so that the latch is trapped in the recess. A hole is formed in the lever. The hole has an upper section and a relatively large lower section. A wedge surface is formed on the underside of the lever. A button has a body connecting with a relatively large head and a groove formed about the body. The body of the button is inserted through the upper section of the hole. A C-clip engages in the groove formed about the body so that the button is trapped in the hole. The spring biases the upper section of the latch into the hole when the recess aligns with the hole so that the lever is retained in an open position. The upper section of the latch moves into the recess when the button is pressed, so that the lever is released from the open position. The wedge surface presses the upper section of the latch into the recess while passing by the same so that the recess can align with the hole.

1 Claim, 3 Drawing Sheets

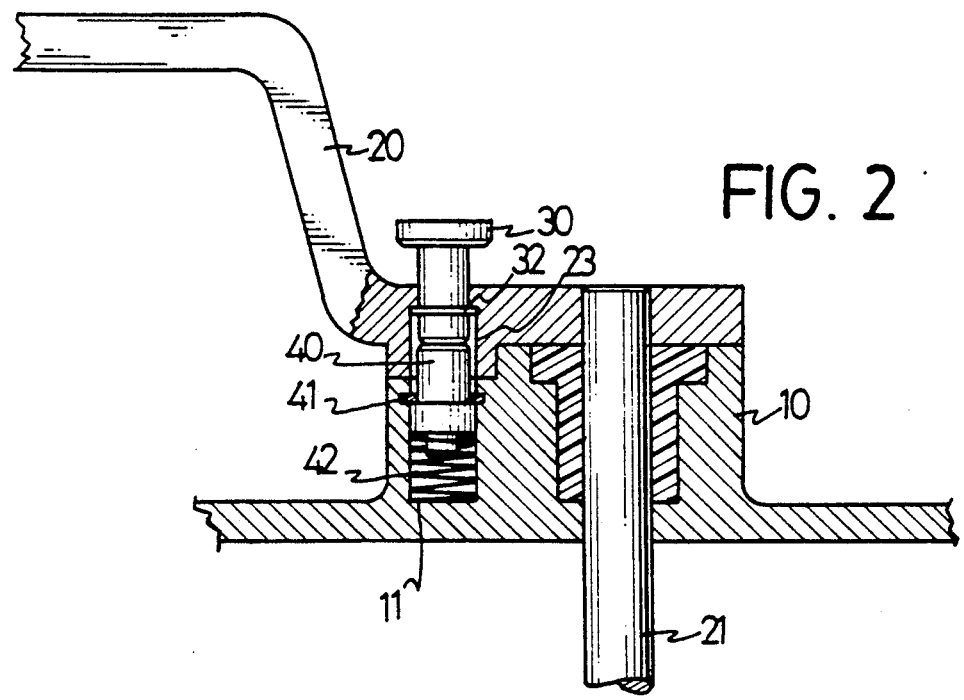
FIG. 2
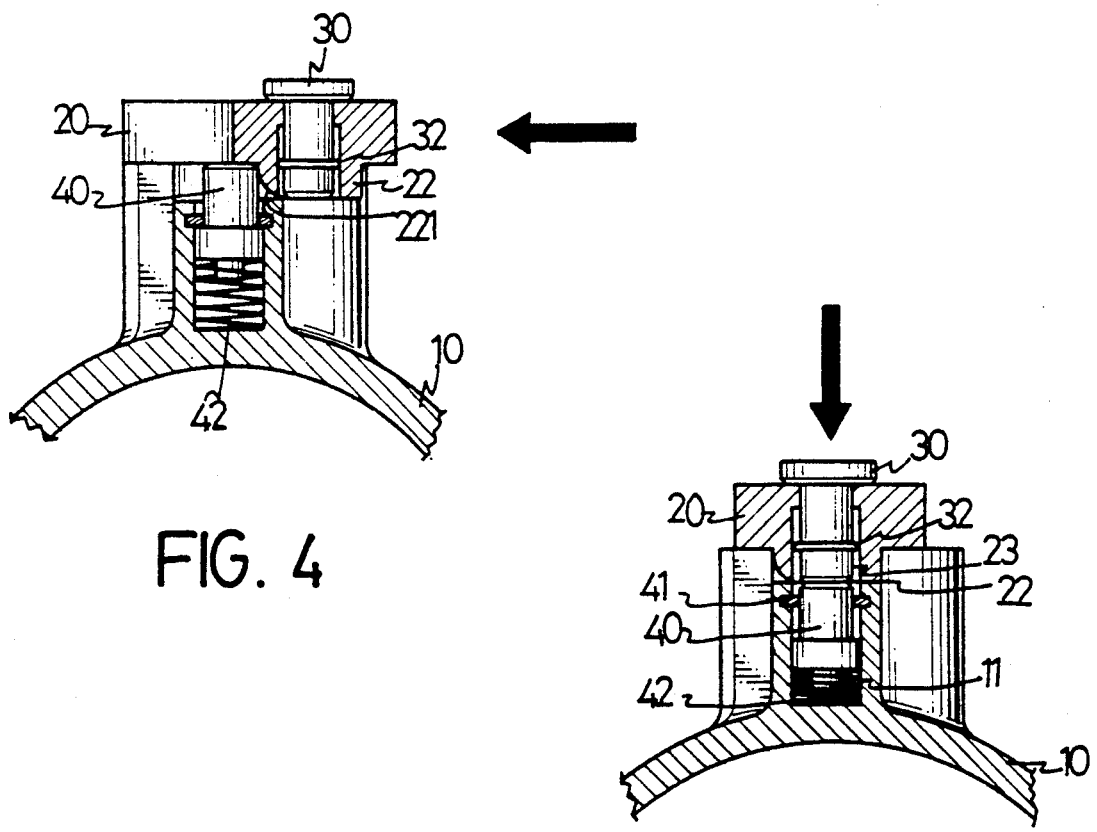
FIG. 4
FIG. 3

DEVICE FOR LOCKING A LEVER FOR PIVOTING A VALVE

BACKGROUND OF INVENTION

1. Field of Invention

The present invention relates to a device for locking a lever for pivoting a valve.

2. Related Prior Art

Referring to FIGS. 5 and 6, a valve (not shown) is contained in a valve housing 50. A lever 60 is attached to the valve by means of a shaft 62. By means of the shaft 62, the lever 60 pivots the valve in order to open/close the valve housing 50. In a closed position of the lever 60, a length of the lever 60 is perpendicular to the axis of the valve housing 50 such that the valve closes the valve housing 50. In an open position of the lever 60, the length of the lever 60 is parallel to the axis of the valve housing 50 such that the valve opens the valve housing 50.

Very often, it is desired to maintain the lever 60 in the open position. A conventional device for locking the lever 60 is illustrated. The conventional device for locking the lever 60 has a block 61 formed on the underside of the lever 60 and an elastic strip 70 attached on the valve housing 50. The block 61 is pivotable about the shaft 62 together with the lever 60 as it is formed on the underside of the lever 60. The elastic strip 70 has a U-shaped form (when seen in a top view) defining a cutout 71 and between a first terminal portion 72 and a second terminal portion 73. The second terminal portion 73 is attached to the valve housing 50 in such a way that the second terminal portion 73 is in a higher position than the first terminal portion 72. The first portion 72 has a first edge and a second edge. Normally, the first edge of the first portion 72 is in a lower position than the second edge of the first portion 72.

Normally, the first edge of the first portion 72 is in a lower position than the bottom of the block 61 so that the block 61 is permitted to slide on the first portion 72 when the lever 60 pivots together with the block 61. The block 61 then bypasses the first terminal portion 72 so as to enter the cutout 71. At that instant, the elastic strip assumes the original form so that the block 61 is trapped in the cutout 71 by means of the first terminal portion 72. That is, the lever 60 is retained in the open position.

The lever 60 can be released from the open position only when the terminal portion 72 is pressed downward so that the second edge thereof is below the bottom of the block 61 and that the block 61 is permitted to slide on the first terminal portion 72. The locking device can only be released by using two hands, one for pressing the first terminal portion 72 and the remaining for pivoting the lever 62. This is inconvenient. Furthermore, hands may be easily cut by means of the elastic strip 70 as the elastic strip 70 is generally made of metal.

Therefore, the present invention is intended to solve the above-mentioned problems.

SUMMARY OF INVENTION

It is an object of the present invention to provide a device for locking a lever for pivoting a valve contained in a valve housing. A recess is formed in the valve housing. A groove is formed in and about the recess. A spring is sited in the recess. A latch has a relatively large middle section connecting an upper section with a lower section. The latch is sited in the recess so that the lower section thereof is inserted in the spring and that the middle portion thereof is sited on the spring. A C-ring engages in the groove so that the latch is trapped in the recess. A hole is formed in the lever. The hole has an upper section and a relatively large lower section. A wedge surface is formed on the underside of the lever. A button has a body connecting with a relatively large head and a groove formed about the body. The body of the button is inserted through the upper section of the hole. A C-clip engages in the groove formed about the body so that the button is trapped in the hole. The spring biases the upper section of the latch into the hole when the recess aligns with the hole so that the lever is retained in an open position. The upper section of the latch moves into the recess when the button is pressed, so that the lever is released from the open position. The wedge surface presses the upper section of the latch into the recess while passing by the same so that the recess can align with the hole.

For a better understanding of the present invention and objects thereof, a study of the detailed description of the embodiments described hereinafter should be made in relation to the accompanying drawings.

BRIEF DESCRIPTION OF DRAWINGS

FIG. 2 is a vertical cross-sectional view taken along a line 2—2 in FIG. 1;

FIG. 3 is a vertical cross-sectional view taken along a line 3—3 in FIG. 1;

FIG. 4 is a vertical cross-sectional view similar to FIG. 3, showing the lever in an open position.

DETAILED DESCRIPTION OF PREFERRED EMBODIMENT

The present invention will be described in detail with reference to FIGS. 1-4 of the drawings showing the preferred embodiment of the present invention.

Figure 1:
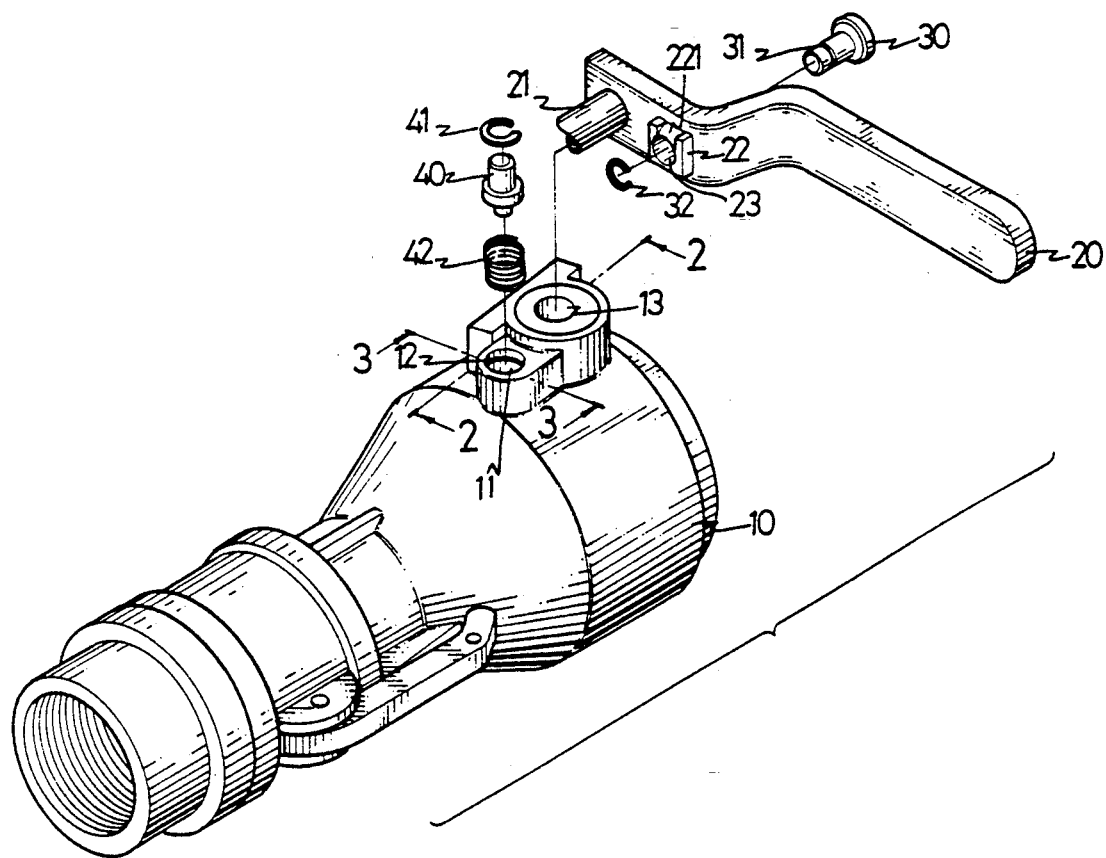
FIG. 1 is a perspective view of a device for locking a lever for pivoting a valve in accordance with the preferred embodiment of the present invention.
Figure 5:
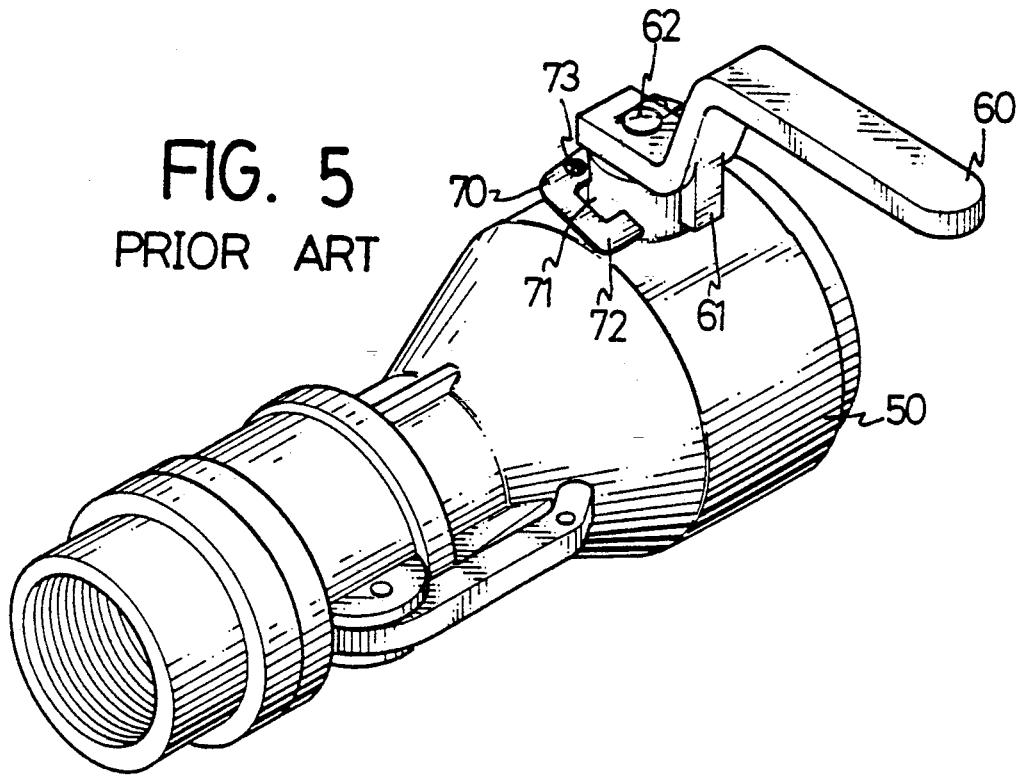
FIG. 5 is a perspective view of a device for locking a lever for pivoting a valve in accordance with prior art.
Figure 6:
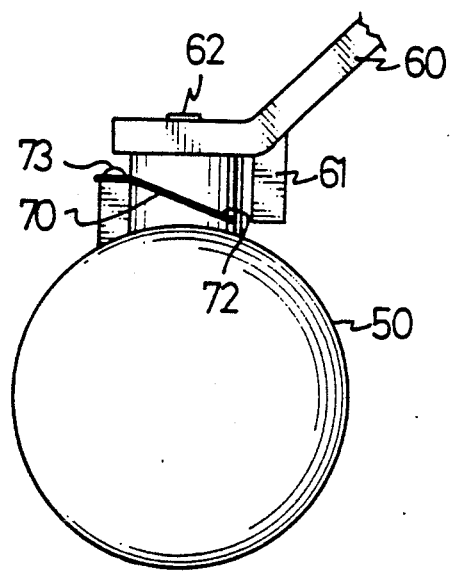
FIG. 6 is a front view of a device for locking a lever for pivoting a valve in accordance with prior art.

Initially referring to FIG. 1 of the drawings, a valve (not shown) is mounted in a valve housing 10. The valve is pivotable between open and closed position in order to open/closed the valve housing 10. A first boss and a second boss are formed on the valve housing 10. The first boss defines a hole 13 axially formed through the first boss and through the valve housing 10. The second boss defines a recess 11 axially formed through the second boss, but not through the valve housing 10.

A lever 20 has a first section and a second section. The first section of the lever 20 is for gripping thereof. The second section of the lever 20 has a hole formed therein. A shaft 21 has a first end fitting in the hole formed in the second section of the lever 20 and a second end projecting through the hole 13 into the valve housing 50 for connecting to the valve. A boss 22 is formed on the underside of the second section of the lever 20 and has a wedge surface 221 formed thereon.

There is a button 30 having a body integrating with a head. The body of the button 30 has a diameter greater than that of the head of the button 30. A groove 31 is formed about the body of the button 30. There is also a C-clip 32.

There is a latch 40 having a middle section connecting two terminal sections with each other. Although one of the terminal sections of the latch 40 has a diameter greater than that of the remaining of the terminal sections of the latch 40 as shown, the terminal sections of the latch 40 can have the same diameter. The middle section of the latch 40 has a diameter greater than that of the terminal sections of the latch 40. There are also a C-ring 41 and a spring 42.

Additionally referring to FIG. 2, the hole 23 has an upper section and a lower section having a relatively large diameter. The body of the button 30 is inserted through the upper section of the hole 23. A C-clip 32 is mounted in the groove 31. The button 30 is slidably attached to the lever 20 by means of the head of the button 30 and the C-clip 32.

The spring 42 is sited in the recess 11. The latch 40 is sited in the recess 11 so that the lower terminal section thereof is inserted in the spring 42 and that the middle section thereof is sited on the spring 42. The C-ring 41 is sited in the recess in order to be engaged in the groove 12. The latch 40 is slidably mounted in the recess 12 with the middle section thereof trapped by means of the C-ring 41.

As shown in FIG. 2 of the drawings, the lever 20 is in the open position. At that instant, the recess 11 aligns with the hole 23 so that the upper section of the latch 40 is partially pushed into the hole 23 by means of the spring 42. Obviously, the lever 20 is retained in the open position.

Additionally referring to FIG. 3 of the drawings, the button 30 is pressed, preferably by a thumb of a hand. At that instant, the upper section of the latch 40 is not even partially sited in the hole 23 and the body of the button 30 is not even partially sited in the recess 11. Obviously, the lever 20 can be pivoted by the same hand. The device in accordance with the present invention can be manipulated by one single hand.

Additionally referring to FIG. 4 of the drawings, the lever 20 is pivoted from the closed position to a position so that the wedge surface formed on the boss 22 contacts the upper section of the latch 40. The wedge surface formed on the boss 22 presses the upper section of the latch 40 into the recess 11 so that the hole 23 can align with the recess 11. At that instant, the spring 42 biases the upper section of the latch 40 partially into the hole 23. The lever 20 is retained in the open position again. As the device in accordance with the present invention does not employ any metal strip with any sharp edge, there is no risk of cutting hands of operators.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

I claim:

1. A device for locking a lever for pivoting a valve contained in a valve housing, comprising:

a recess formed in the valve housing;

a groove formed in and about said recess;

a spring sited in said recess;

a latch comprising a relatively large middle section connecting an upper section with a lower section, said latch being sited in said recess so that said lower section thereof is inserted in said spring and that said middle portion thereof is sited on the spring;

a C-ring engaging in said groove so that said latch is trapped in said recess;

a hole formed in the lever, said hole comprising an upper section and a relatively large lower section;

a wedge surface extending from the underside of the lever towards the latch;

a button comprising a body connecting with a relatively large head and a groove formed about said body, said body of said button being inserted through said upper section of said hole; and a C-clip engaging in said groove formed about said body so that said button is trapped in said hole;

wherein pivoting the lever towards an open position from a closed position engages said wedge surface with said upper section of said latch so that said wedge surface presses said upper section of said latch into the recess, such that when said valve is disposed in the open position said hole aligns with said recess and said upper section of said latch is biased into said hole by means of said spring in order to lock the lever in the open position; and wherein pressing said button disengages said upper section of said latch from said hole, and said button and said wedge surface cooperate to prevent said latch from being biased into said hole, thereby allowing the lever to be pivoted towards the closed position from the open position.

* * * * *